(12) United States Patent
Kwon et al.

(10) Patent No.: US 8,781,485 B2
(45) Date of Patent: Jul. 15, 2014

(54) METHOD AND APPARATUS FOR TRANSMITTING SIGNAL IN A WIRELESS COMMUNICATION SYSTEM USING COMP

(75) Inventors: Yeong Hyeon Kwon, Gyeonggi-do (KR); Min Seok Noh, Gyeonggi-do (KR); Ja Ho Koo, Gyeonggi-do (KR); Jae Hoon Chung, Gyeonggi-do (KR); Seung Hee Han, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 379 days.

(21) Appl. No.: 13/123,992

(22) PCT Filed: Dec. 14, 2009

(86) PCT No.: PCT/KR2009/007466
§ 371 (c)(1),
(2), (4) Date: Apr. 13, 2011

(87) PCT Pub. No.: WO2010/074444
PCT Pub. Date: Jul. 1, 2010

(65) Prior Publication Data
US 2011/0201371 A1    Aug. 18, 2011

Related U.S. Application Data

(60) Provisional application No. 61/140,634, filed on Dec. 24, 2008.

(51) Int. Cl.
*H04W 72/00*    (2009.01)

(52) U.S. Cl.
USPC .................................. 455/450; 455/443

(58) Field of Classification Search
USPC ...................... 455/450, 443, 452.1
See application file for complete search history.

(56) References Cited

U.S. PATENT DOCUMENTS

| 8,150,399 B2 * | 4/2012 | Wong et al. .............. 455/443 |
| 2005/0286408 A1 | 12/2005 | Jin et al. |

FOREIGN PATENT DOCUMENTS

| KR | 2004-0086062 | 10/2004 |
| WO | 01/89158 | 11/2001 |
| WO | 2004/016022 | 2/2004 |

OTHER PUBLICATIONS

International Search Report from PCT/KR2009/007466.

* cited by examiner

*Primary Examiner* — Tu X Nguyen
(74) *Attorney, Agent, or Firm* — Morgan, Lewis & Bockius LLP

(57) ABSTRACT

A method for transmitting a signal to a UE by a BS in a wireless communication system is disclosed. The method includes determining a signal transmission scheme for transmitting a signal to the UE, dividing a basic resource allocation unit, if the signal transmission scheme is CoMP transmission, allocating transmission resources to the UE using the divided basic resource allocation unit, and transmitting the signal to the UE through the allocated transmission resources.

8 Claims, 7 Drawing Sheets

METHOD AND APPARATUS FOR TRANSMITTING SIGNAL IN A WIRELESS COMMUNICATION SYSTEM USING COMP

The present application is a national stage of PCT International Application No. PCT/KR2009/007466, filed Dec. 14, 2009, and claims the benefit of U.S. Provisional Application No. 61/140,634, filed Dec. 24, 2008.

TECHNICAL FIELD

The present invention relates to a wireless communication system, and more particularly, to a method for transmitting signals to a plurality of User Equipments (UEs) using a Coordinated Multi-Point (CoMP) scheme by a Base Station (BS) in a wireless communication system.

BACKGROUND ART

Multiple Input Multiple Output (MIMO) has recently attracted much attention as a broadband wireless mobile communication technology. A MIMO system seeks to increase data communication efficiency by use of a plurality of antennas. Depending on whether the same data or different data are transmitted through antennas, MIMO techniques are classified into spatial multiplexing and spatial diversity.

Spatial multiplexing is characterized in that different data are transmitted through a plurality of Transmission (Tx) antennas simultaneously. Therefore, data can be transmitted at a high rate without increasing a system bandwidth. In Spatial diversity, the same data is transmitted through a plurality of Tx antennas, thus achieving transmit diversity. Space time channel coding is a kind of spatial diversity scheme.

Depending on whether a receiver feeds back channel information to a transmitter, MIMO techniques are also categorized into open-loop MIMO and closed-loop MIMO. Open-loop MIMO schemes include Bell Labs Layered Space-Time (BLAST) and Space-Time Trellis Coding (STTC). According to BLAST, the transmitter transmits information in parallel and the receiver detects signals by repeating Zero Forcing (ZF) or Minimum Mean Square Error (MMSE) detection. Thus as much information as the number of Tx antennas can be transmitted. STTC achieves transmit diversity and coding gain by utilizing space. Transmit Antenna Array (TxAA) is a closed-loop MIMO technique.

CoMP was proposed to improve the throughput of a user at a cell edge by applying advanced MIMO under a multi-cell environment. The use of CoMP may reduce Inter-Cell Interference (ICI) in the multi-cell environment. Multi-cell BSs may provide joint data support to a UE by a CoMP operation. Also, each BS may improve system performance by simultaneously supporting one or more UEs MS 1 to MS K. A BS may implement Space Division Multiple Access (SDMA) based on channel state information between the BS and UEs.

There are largely two CoMP operation modes, joint processing being a cooperative MIMO based on data sharing and Coordinated Scheduling/Beamforming (CS/CB) mode.

In a CoMP wireless communication system, a serving cell and one or more cooperating cells may be connected to a scheduler over a backbone network. The scheduler receives feedback channel information representing a channel state between a UE and each cooperating cell, as measured by the cooperating cell. For example, the scheduler may schedule cooperative MIMO information for the serving cell and one or more cooperating cells. That is, the scheduler may issue a command related to a cooperative MIMO operation directly to each cell.

One of major problems with the CoMP technology is that resource utilization is restricted in multiple cells. For example, if a cell uses a specific resource unit for a UE, two or more cells use the same resources to support the UE in a CoMP operation. Therefore, the whole throughput of multiple cells may be adversely affected.

Accordingly, multi-user CoMP (MU-CoMP) should be implemented to support CoMP transmission to a plurality of UEs in the same resources. However, if each of UEs for which a CoMP operation is performed should decode traffic destined for the other UEs as well as traffic destined for the UE in MU-CoMP, many problems may occur in terms of security, hardware complexity, power consumption, etc.

DISCLOSURE OF INVENTION

Technical Problem

An object of the present invention devised to solve the problems lies on a structure that enables easy implementation of MU-CoMP.

It will be appreciated by persons skilled in the art that that the objects that could be achieved with the present invention are not limited to what has been particularly described hereinabove and the above and other objects that the present invention could achieve will be more clearly understood from the following detailed description taken in conjunction with the accompanying drawings.

Solution to Problem

The object of the present invention can be achieved by providing a method for transmitting a signal to a UE by a BS in a wireless communication system, including determining a signal transmission scheme for transmitting a signal to the UE, dividing a basic resource allocation unit, if the signal transmission scheme is CoMP transmission, allocating transmission resources to the UE using the divided basic resource allocation unit, and transmitting the signal to the UE through the allocated transmission resources.

The basic resource allocation unit may be divided in a frequency domain, a time domain, or a code domain according to a number of UEs located at a boundary between BSs.

The basic resource allocation unit may be a resource block or a resource allocation unit for CoMP.

In another aspect of the present invention, provided herein is a BS in a wireless communication system, including a processor for dividing a basic resource allocation unit, if a signal transmission scheme for transmitting a signal to a UE is CoMP transmission and allocating transmission resources to the UE using the divided basic resource allocation unit, and a transmission module for transmitting the signal to the UE through the allocated transmission resources.

The process may divide the basic resource allocation unit in a frequency domain, a time domain, or a code domain according to a number of UEs located at a boundary between BSs.

The basic resource allocation unit may be a resource block or a resource allocation unit for CoMP.

Advantageous Effects of Invention

According to exemplary embodiments of the present invention, a plurality of cells can effectively transmit signals to a UE in a wireless communication system using an MU-CoMP scheme.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

MODE FOR THE INVENTION

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. The same reference numbers will be used throughout this specification to refer to the same or like parts.

The phraseology and terminology used in the specification and the appended claims should not be interpreted as limited general or literal meanings. Rather, they should be interpreted according to the technical features of the present invention based on the principle that the inventor can define terms appropriately to describe his invention in the best way.

According to the present invention, a cell or sector refers to a coverage area managed by a Base Station (BS). For the convenience sake of description, each BS manages one cell or sector, which should not be construed as limiting the present invention. Yet, one BS may manage a plurality of cells or sectors.

Figure 1:
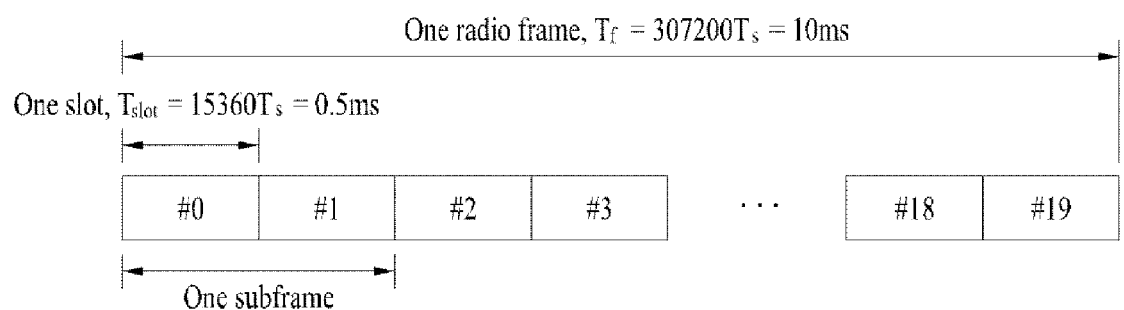
FIG. 1 illustrates an exemplary radio frame structure in a Long Term Evolution (LTE) system.

FIG. 1 illustrates an exemplary radio frame structure in a Long Term Evolution (LTE) system.

Referring to FIG. 1, a radio frame is 10 ms (327,200*Ts) long, including 10 equal subframes. Each subframe is 1 ms long, including two slots. Hence, the duration of each slot is 0.5 ms (15,360*Ts). Ts represents a sampling time that satisfies Ts=(1/15kHz×2048)=3.2552×10-8(about 33 ns). Each slot includes a plurality of Orthogonal Frequency Division Multiplexing (OFDM) symbols in the time domain and a plurality of Resource Blocks (RBs) in the frequency domain. An RB is a basic resource allocation unit for signal transmission in the LTE system.

Each RB includes 12 subcarriers by 7 or 6 OFDM symbols in the LTE system. A data transmission time unit, Transmission Time Interval (TTI) may be defined as one or more subframes. This radio frame structure is a mere example. Thus, the number of subframes in a radio frame, the number of slots in a subframe, and the number of OFDM symbols in a slot may vary.

Figure 2:
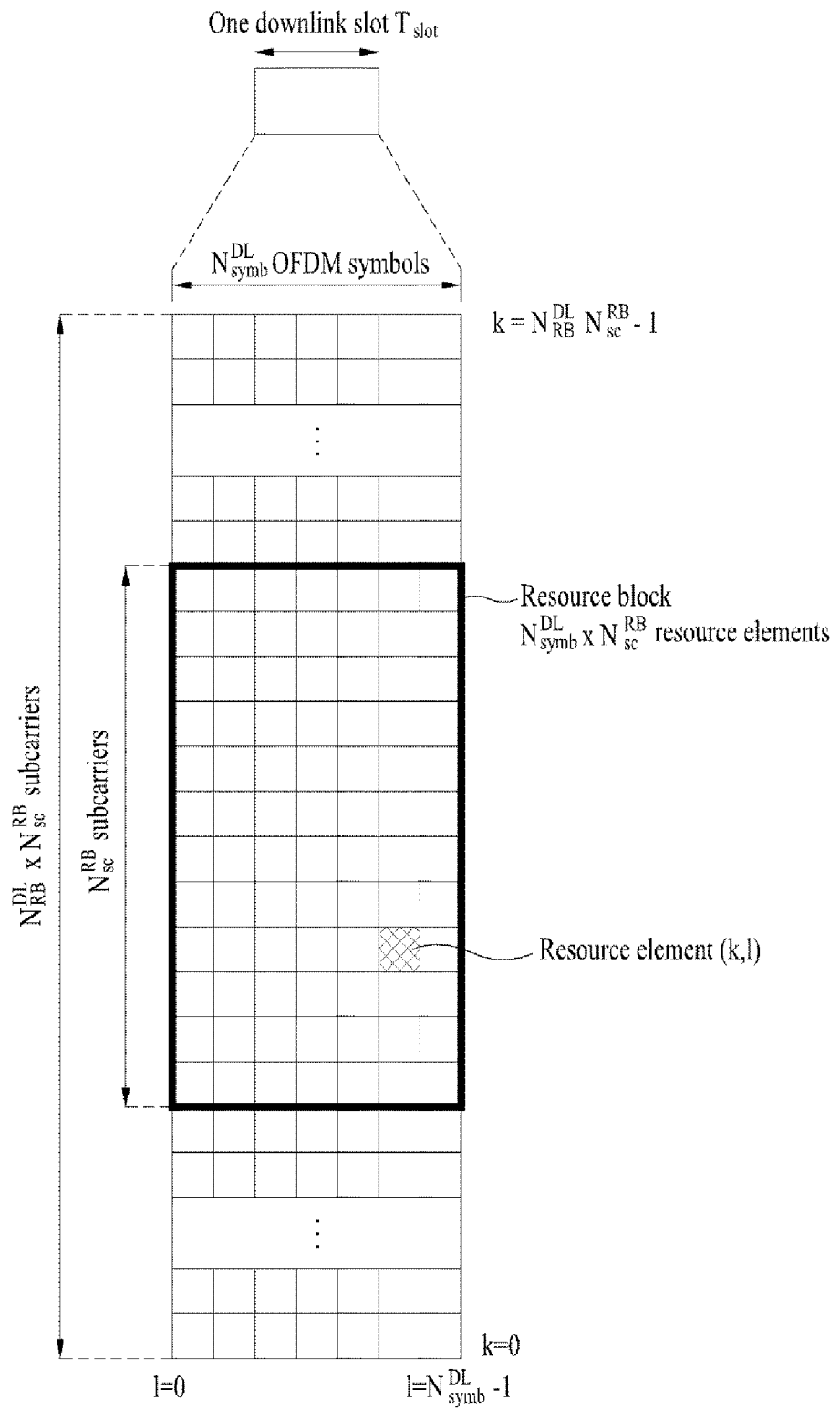
FIG. 2 illustrates an exemplary resource grid for a downlink slot.

FIG. 2 illustrates an exemplary resource grid of a downlink slot.

Referring to FIG. 2, a downlink slot includes $N_{symb}^{DL}$ OFDM symbols in the time domain and $N_{RB}^{DL}$ RBs in the frequency domain. Since each RB includes $N_{sc}^{RB}$ subcarriers, the downlink slot has $$N_{RB}^{DL} \times N_{sc}^{RB}$$

subcarriers in the time domain. It is shown in FIG. 2 that the downlink slot has 7 OFDM symbols and on RB includes 12 subcarriers, to which the present invention is not limited. For example, the number of OFDM symbols included in the downlink slot may vary according to the length of a Cyclic Prefix (CP).

Each element in the resource grid is referred to as a Resource Element (RE) and an RE is represented by an OFDM symbol index and a subcarrier index. One RB includes $$N_{symb}^{DL} \times N_{RB}^{DL}$$

REs. The number of RBs included in the downlink slot, $N_{RB}^{DL}$ depends on a downlink transmission bandwidth set by a cell.

Figure 3:
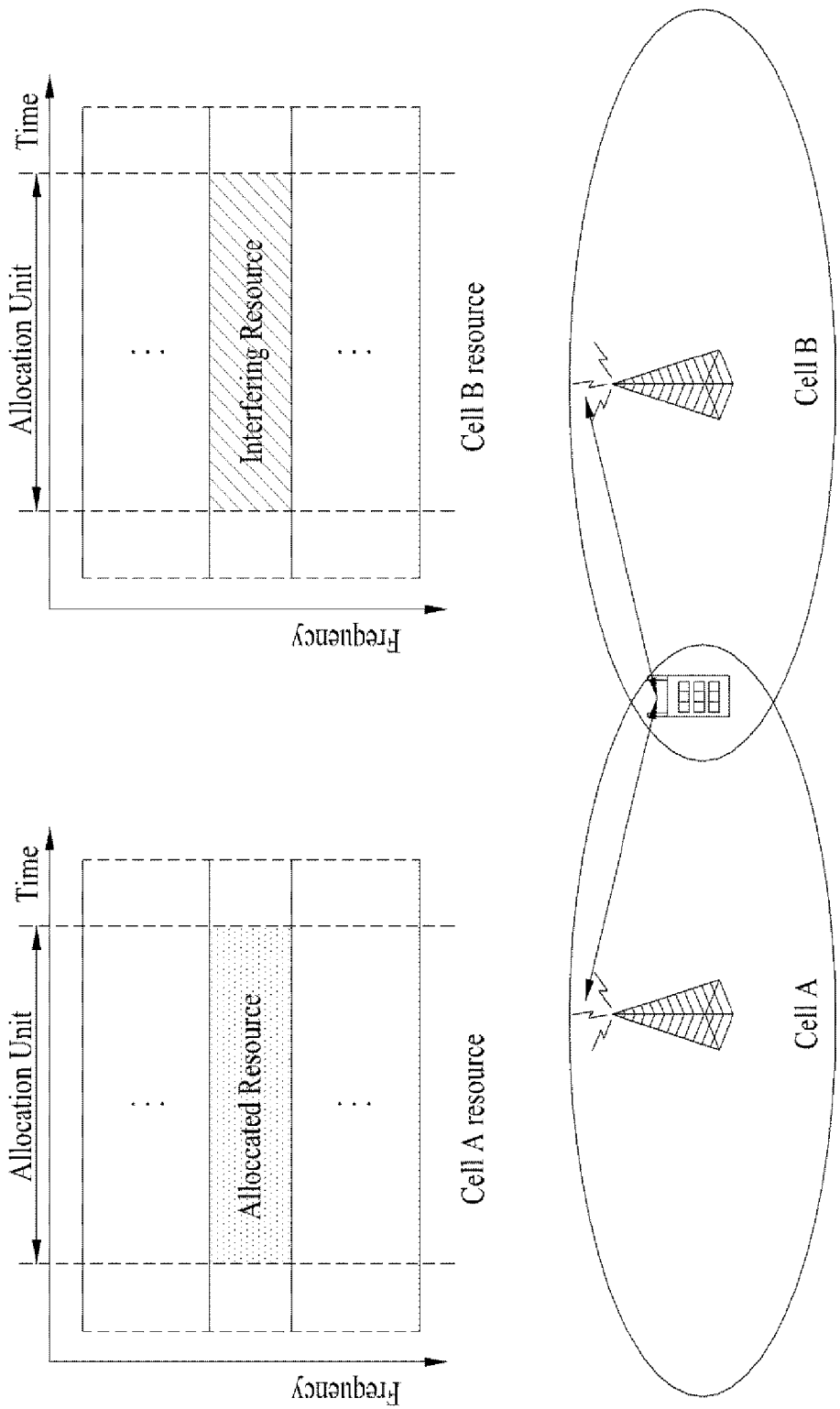
FIG. 3 illustrates signals that a User Equipment (UE) at the boundary between cells receives from the cells in a typical wireless communication system.

FIG. 3 illustrates signals that a UE at the boundary between cells receives from the cells in a typical wireless communication system.

Referring to FIG. 3, when a serving cell and a neighboring cell use the same resources, a UE at the boundary between the cells considers a signal received from the neighboring cell to be interference. Without information about the neighboring cell, the UE simply interprets the signal received from the neighboring cell as an interference signal which decreases the Signal-to-Interference and Noise Ratio (SINR) of the UE. This phenomenon takes place often in a network with a frequency reuse factor of 1, particularly when the distance between cells is narrow as in an urban area.

When the neighboring cell transmits a signal in the same frequency resources, an action that the UE may take is interference cancellation. For the interference cancellation, the serving cell may transmit information about the interference signal to the UE. For example, if UE performs decoding-based interference cancellation, the serving cell should transmit information about the neighbor cell, which is required for decoding to the UE, such as Modulation and Coding Scheme (MCS) information, channel coding information, interleaving information, redundancy information, and a block size.

On the other hand, if the UE performs detection-based interference cancellation, the serving cell has only to transmit information about a modulation order to the UE. With the detection-based interference cancellation scheme, the UE may cancel interference to a certain degree without receiving all information about the neighbor cell.

If the UE has knowledge of the format of the signal that the neighboring cell transmits in the same resources or the signal from the neighboring cell is not distinguished from the signal from the serving cell, the UE may utilize the signal from the neighboring cell. For this purpose, CoMP is used.

Figure 4:
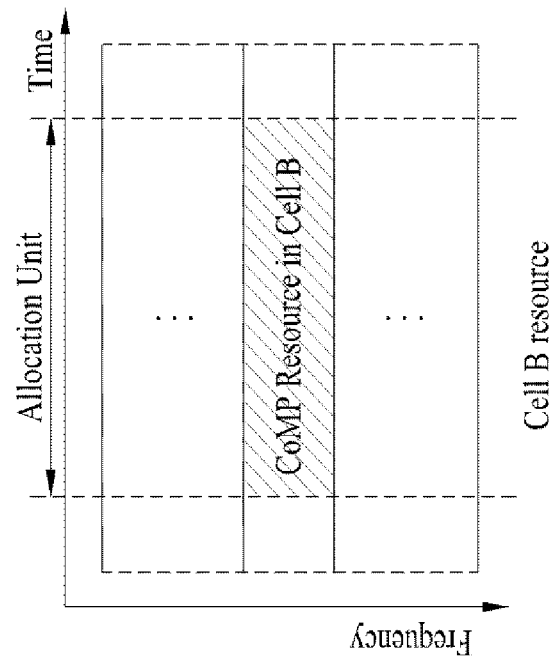
FIG. 4 illustrates a resource allocation structure in a wireless communication system using a general Coordinated Multi-Point (CoMP) scheme.
Figure 4:
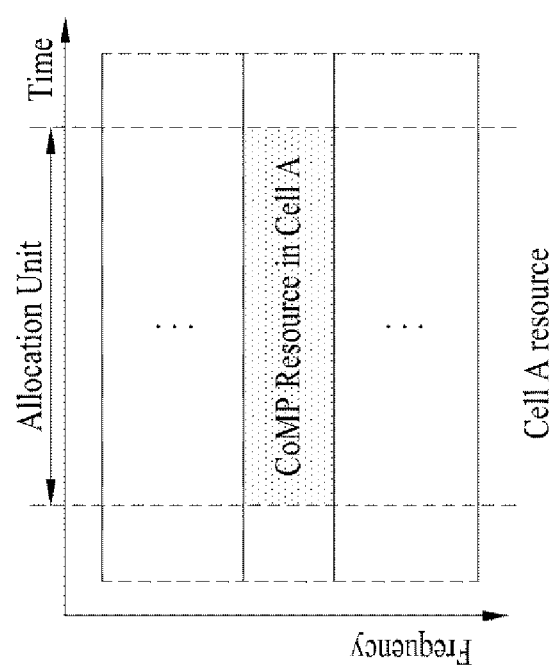

FIG. 4 illustrates a resource allocation structure in a wireless communication system using a general CoMP scheme.

Referring to FIG. 4, the resource allocation structure is a basic one for CoMP transmission, designed to turn an ICI-caused SINR decrease into a Signal-to-Noise Ratio (SNR) increase by allowing the UE to interpret the interference signal from the neighboring cell as the signal from the serving cell.

The CoMP technology generically refers to techniques for eliminating or minimizing an interference signal that a neighboring cell transmits to a UE. There are two CoMP modes, Coordinated Scheduling/Beamforming (CS/CB) mode and joint processing mode. An interference signal is reduced by simply controlling a precoding matrix or beamforming for each cell when the cell uses specific resources in the CS/CB mode, whereas the serving cell and the neighboring cell transmit the same signal to the UE using a specific combination of precoding matrices, thereby increasing reception reliability in the joint processing mode.

Especially in the joint processing mode, signal reception at the UE is equivalent to reception of a signal from the serving cell with higher power. This implies that a higher received signal level is ensured for the UE.

However, the same resources are allocated to the UE at the boundary between the serving cell and the neighboring cell. As a result, resources may be wasted. Specifically, in the case where a basic resource allocation unit is one RB as in the current 3rd Generation Partnership Project Long Term Evolution (3GPP LTE) system, the frequency efficiency that can be achieved by CoMP transmission just satisfies a level that a legacy UE requires and moreover, excessive resource allocation may cause resource waste.

To avert the resource waste problem, the following two methods may be considered. One is that the CoMP cells support a UE in the serving cell at one transmission time and a UE in the neighboring cell at another transmission time. The other method is that one RB is used to support the UE of the serving cell and another RB is used to support the UE of the neighboring cell.

Considering a minimum transmission block size, resource allocations on an RB basis may lead to a great resource waste. If a large number of UEs exist at the boundary between cells in an extreme case, the number of UEs that one cell can support may be reduced by the number of neighboring cells. Though following text describes current invention in terms of RB, the minimum resource allocation unit for CoMP operation can be different from RB and designed to exploit the same resource utilization scheme which is described below.

Figure 5:
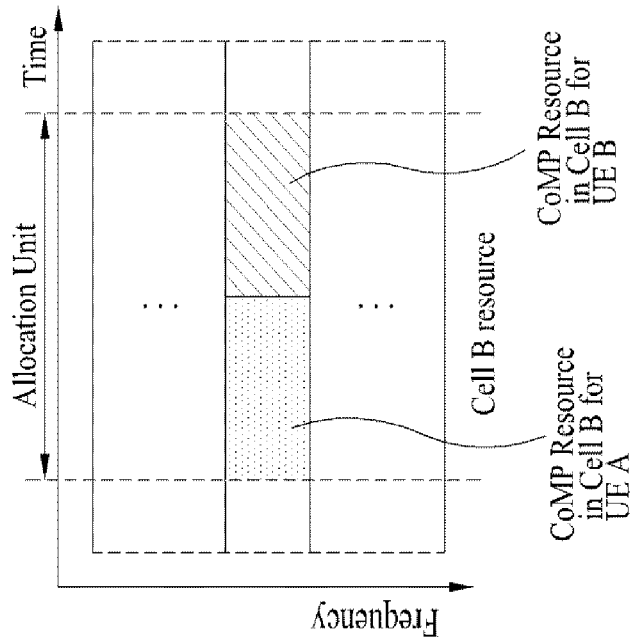
FIGS. 5 and 6 illustrate resource allocation methods according to exemplary embodiments of the present invention.
Figure 5:
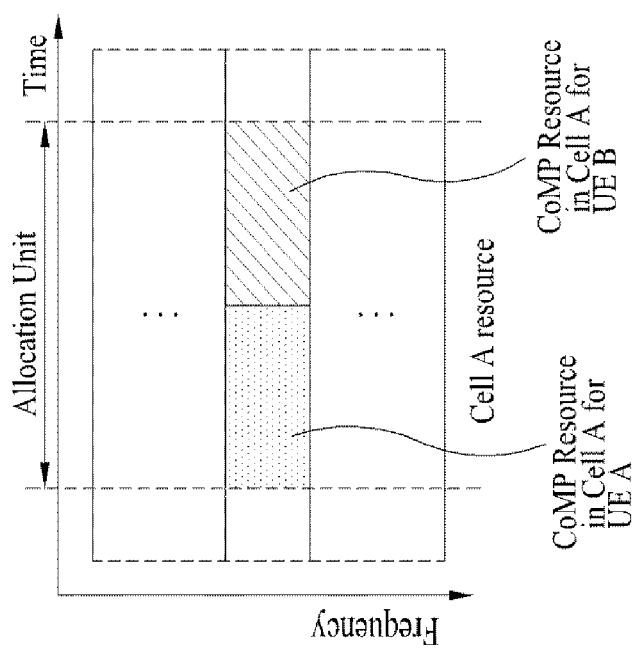
Figure 6:
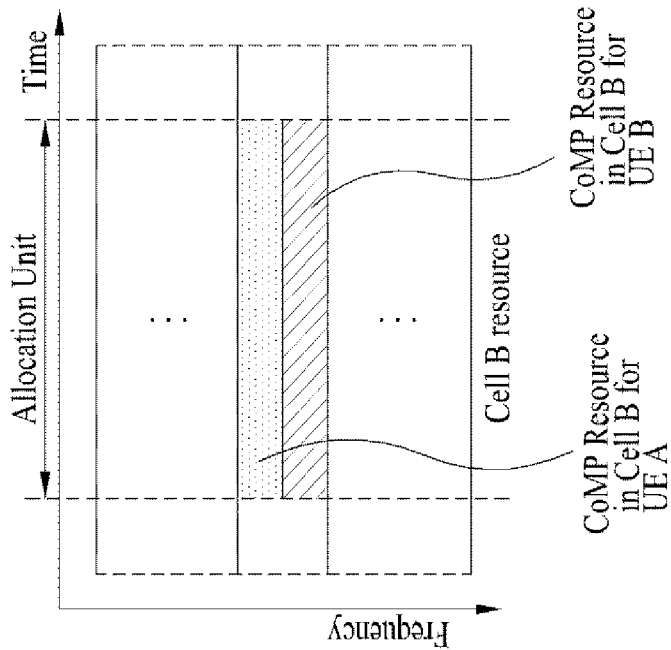
Figure 6:
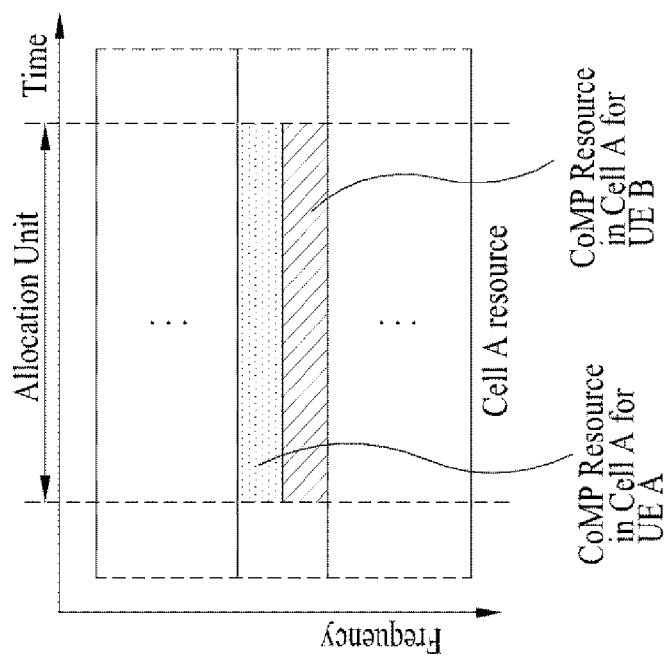

FIGS. 5 and 6 illustrate resource allocation methods according to exemplary embodiments of the present invention.

To save resources, CoMP cells divide an RB being a basic resource allocation unit and allocate RB segments to a UE. The RB segmentation is carried out along the time axis as illustrated in FIG. 5 or along the frequency axis as illustrated in FIG. 6.

To be more specific, frequency resources of a subframe are divided along the time axis into segments each having, for example, a predetermined number of OFDM symbols or slots and the segments are allocated to specific UEs, as illustrated in FIG. 5. If resources are divided along the frequency axis into segments each having contiguous or distributed subcarriers in an RB as illustrated in FIG. 6, the segments are allocated to specific UEs.

Apart from the resource allocation methods illustrated in FIGS. 5 and 6, an RB may be code-divided by use of a spreading factor. When an RB is divided into two segments, a spreading sequence of length 2 may be used. In this case, spreading may be performed along the time or frequency axis.

For example, if two cells participate in a CoMP transmission, they use a spreading sequence of [1 1] for a UE and a spreading sequence of [1 −1] for another UE. Then the former UE performs dispreading using the spreading sequence of [1 1] to detect a signal destined for the UE.

Spatial resource division may further be contemplated. This means that signals are transmitted to UEs through different antennas. As the signals may still be mixed and the antennas may not be distinguished from each other, spreading sequences for the UEs may be applied to the antennas corresponding to the UEs. Also, a signal may be transmitted to a UE through a specific set of antennas, whereas a signal may be transmitted to another UE through another set of antennas.

In case of the time-division, frequency-division, or code-division of resources, the UE needs to estimate channels between the UE and the serving and neighboring cells in order to decode data received in divided resources. For the channel estimation, reference signals should be transmitted. Because a reference signal is cell-specific and common within a cell, it may not be dedicated to the UE that receives data by CoMP transmission. Therefore, if the UE receives signals from both the serving and neighboring cells, it may not use the conventional reference signal as resources for data decoding. The cell-specific resources should not be included CoMP transmission resources and if they are inevitably included in the CoMP transmission resources, the resources are subjected to an operation such as puncturing or rate matching.

In this context, when a signal is transmitted to the UE in the foregoing resource division methods, it is preferably to transmit reference symbols for CoMP transmission along with the signal to the UE. That is, when resources are divided in time or in frequency, reference symbols for CoMP transmission are also transmitted to thereby enable channel estimation within the resources.

If the resources are divided by codes, reference symbols are also preferably spread. That is, reference symbols should be transmitted in independent resources to each UE supported by CoMP transmission.

Further, if there are only UEs to which whole RBs should be allocated in a CoMP operation, the total number of UEs that can be supported is decreased. Therefore, to avoid a CoMP transmission-incurred limit on the total number of UEs that a cell can support, the cell may restrict the Channel Quality Information (CQI) of a UE that can be supported by CoMP transmission in the present invention.

For example, if CoMP transmission of the present invention is performed only when a CQI that can be achieved for a UE by CoMP is equal to or larger than a predetermined threshold, resources divided into segments each being smaller than a basic allocation unit can be allocated to a UE. This implies that a plurality of UEs may be supported using a conventional basic allocation unit.

It is noted from a 3GPP standard document, TS 36.213 that an MCS is closely related to a transmission block size, that is, a resource allocation size in the LTE system.

Therefore, CoMP transmission may be performed using part of a conventional MCS allocation table or a newly defined MCS allocation table in the present invention. Then resource allocation information associated with an MCS order may be represented in a reduced number of bits, thereby decreasing overhead.

An indication regarding associated resources may be expressed in conjunction with an MCS. For instance, if a transmission rate increased by three times due to CoMP transmission, a third of a basic allocation unit suffices. Thus when the MCS definition is changed from a basic MCS x to a CoMP MCS y, the size f a resource allocation unit may be determined based on the MCS disparity between the basic MCS x and the CoMP MCS y, and information indicating allocated resources may be configured additionally.

In addition, if one RB is divided into a predetermined number of (e.g. two or three) segments for CoMP transmission, information about allocated resources may be transmitted to a UE by an indication bit. Thus the UE identifies the CoMP transmission of the present invention by the indication bit and receive a signal in the allocated resources.

In the case where resources are divided for CoMP transmission as described above, if similar amounts of data should be transmitted to the UEs and the UEs have similar CoMP CQIs, a cell may transmit a grant based on a specific allocation unit which is combined with resources corresponded to each UE. Preferably, resources corresponded to each UE allocated by the grant in combination are a multiple of an RB allocation unit and the total physical structure of used RBs is designed so that the RBs may be allocated to a legacy UE.

In this resource allocation scheme, however, some limitations may exist according to the situation of the scheduler or the UEs. Therefore, a basic allocation unit is reduced to a half or third of an RB rather than a combination of UEs is searched for. Then a new grant format is defined for the UEs. The new grant format is designed for LTE-Advanced (LTE-A) UEs. If a segment of one RB is allocated to a UE for CoMP transmission, it is preferable that the remaining segments of the RB are allocated to other UEs for CoMP transmission.

Figure 7:
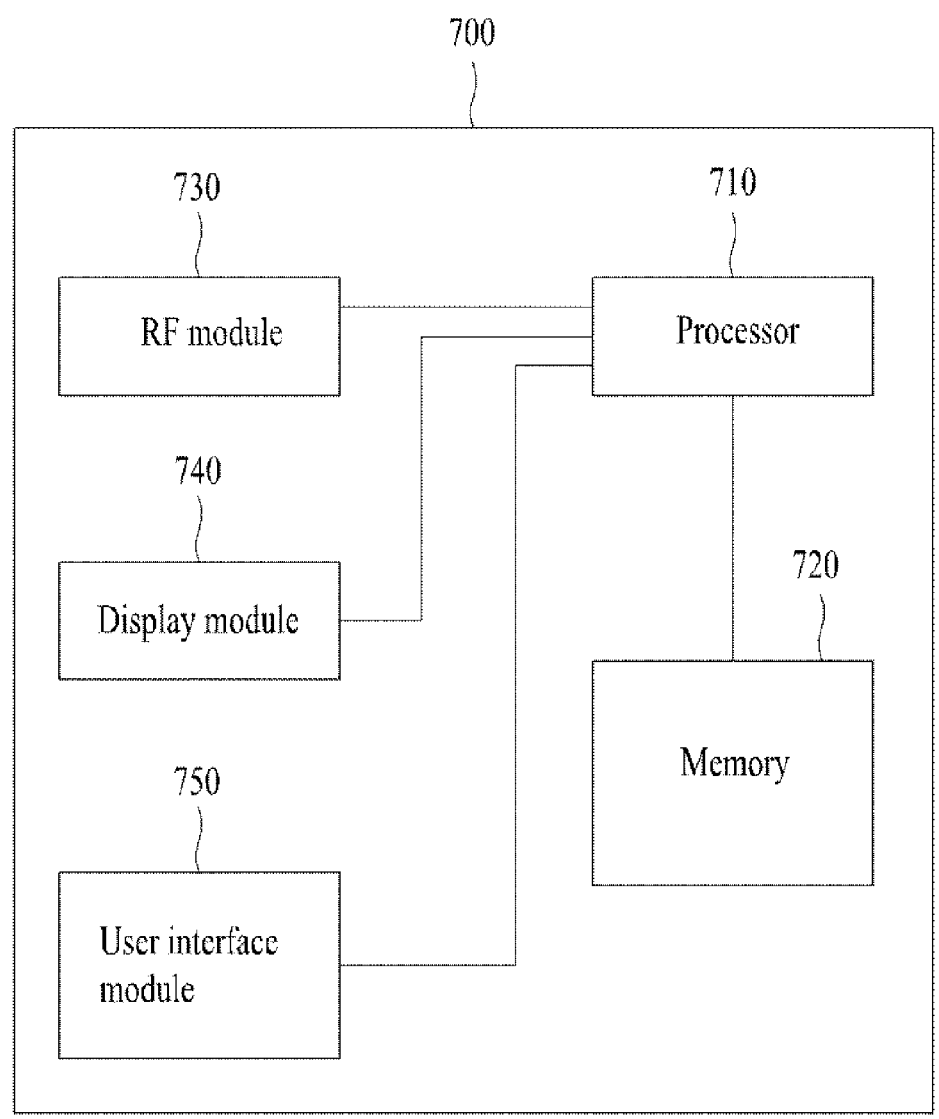
FIG. 7 is a block diagram of a communication transceiver according to an exemplary embodiment of the present invention.

FIG. 7 is a block diagram of a communication transceiver according to an exemplary embodiment of the present invention. The transceiver may be part of a UE or a BS.

Referring to FIG. 7, a transceiver 700 includes a processor 710, a memory 720, a Radio Frequency (RF) module 730, a display module 740, and a user interface module 750. The transceiver 700 is shown for illustrative purposes. Thus part of the modules of the transceiver 700 may be omitted, a necessary module may be added to the transceiver 700, and a single module may be separated into two or more modules in the transceiver 700. The processor 720 is adapted to perform the exemplary embodiments of the present invention. To be more specific, if the transceiver 700 is in a BS, the processor 720 may operate as described with reference to FIGS. 1 to 6. The memory 720 is connected to the processor 710 and stores an operating system, application programs, program codes, data, etc. The RF module 730, which is connected to the processor 710, upconverts a baseband signal to an RF signal or downconverts an RF signal to a baseband signal. For this operation, the RF module 730 performs digital to analog conversion, amplification, filtering and frequency upconversion, or performs digital to analog conversion, amplification, filtering and frequency upconversion reversely. The display module 740 is connected to the processor 710 and displays various information. The display module 740 may include, but not limited to, known elements such as a Liquid Crystal Display (LCD), a Light Emitting Diode (LED), an Organic Light Emitting Diode (OLED), etc. The user interface module 750, which is connected to the processor 710, may be implemented into a combination of known user interfaces such as a keypad, a touch screen, etc.

INDUSTRIAL APPLICABILITY

The present invention is applicable to a wireless communication system, particularly to a method and apparatus for effectively transmitting signals to a UE by a plurality of cells in a wireless communication system using a CoMP scheme.

Exemplary embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment of the present invention or included as a new claim by a subsequent amendment after the application is filed.

In exemplary embodiments of the present invention, a description is mainly made of a data transmission and reception relationship between a BS and a UE. Here, a specific operation described as being performed by the BS may be performed by an upper node of the BS. Namely, it is apparent that, in a network comprised of a plurality of network nodes including a BS, various operations performed for communication with the UE may be performed by the BS, or network nodes other than the BS. The term 'BS' may be replaced with a fixed station, a Node B, an evolved Node B (eNB or eNode B), an access point, etc. The term 'UE' may be replaced with a mobile terminal, a Mobile Station (MS), a mobile subscriber station (MSS), etc.

The exemplary embodiments of the present invention may be achieved by various means, for example, hardware, firmware, software, or a combination thereof. In a hardware configuration, the embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. A software code may be stored in a memory and driven by a processor. The memory is located at the interior or exterior of the processor and may transmit data to and receive data from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for transmitting a signal to a User Equipment (UE) by a Base Station (BS) in a wireless communication system, the method comprising:
   determining a signal transmission scheme for transmitting a signal to the UE;
   dividing a basic resource allocation unit, if the signal transmission scheme is Coordinated Multi-Point (CoMP) transmission;
   allocating transmission resources to the UE using the divided basic resource allocation unit; and
   transmitting the signal to the UE through the allocated transmission resources,
   wherein a size of the allocated transmission is determined according to a MCS (Modulation and Coding Scheme) disparity between a basic MCS and a COMP MCS, and
   wherein when the size of the allocated transmission resource is a segment of a resource block, the remaining segments of the resource block are allocated to other UEs for CoMP transmission.

2. The method according to claim 1, wherein the step of dividing the basic resource allocation unit comprises dividing the basic resource allocation unit in a frequency domain according to a number of UEs located at a boundary between BSs.

3. The method according to claim 1, wherein the step of dividing the basic resource allocation unit comprises dividing the basic resource allocation unit in a time domain according to a number of UEs located at a boundary between BSs.

4. The method according to claim 1, the step of dividing the basic resource allocation unit comprises applying spreading sequences according to a number of UEs located at a boundary between BSs.

5. A Base Station (BS) in a wireless communication system, comprising:
   a processor for dividing a basic resource allocation unit, if a signal transmission scheme for transmitting a signal to a User Equipment (UE) is Coordinated Multi-Point (CoMP) transmission and allocating transmission resources to the UE using the divided basic resource allocation unit; and
   a transmission module for transmitting the signal to the UE through the allocated transmission resources,
   wherein a size of the allocated transmission resources is determined according to a MCS (Modulation and Coding Scheme) disparity between a basic MCS and a COMP MCS, and
   wherein when the size of the allocated transmission resources is a segment of a resource block, the remaining segments of the resource block is allocated to other UEs for CoMP transmission.

6. The BS according to claim 5, wherein the processor divides the basic resource allocation unit in a frequency domain according to a number of UEs located at a boundary between BSs.

7. The BS according to claim 5, wherein the processor divides the basic resource allocation unit in a time domain according to a number of UEs located at a boundary between BSs.

8. The BS according to claim 5, wherein the processor applies spreading sequences according to a number of UEs located at a boundary between BSs.

* * * * *